UNITED STATES PATENT OFFICE.

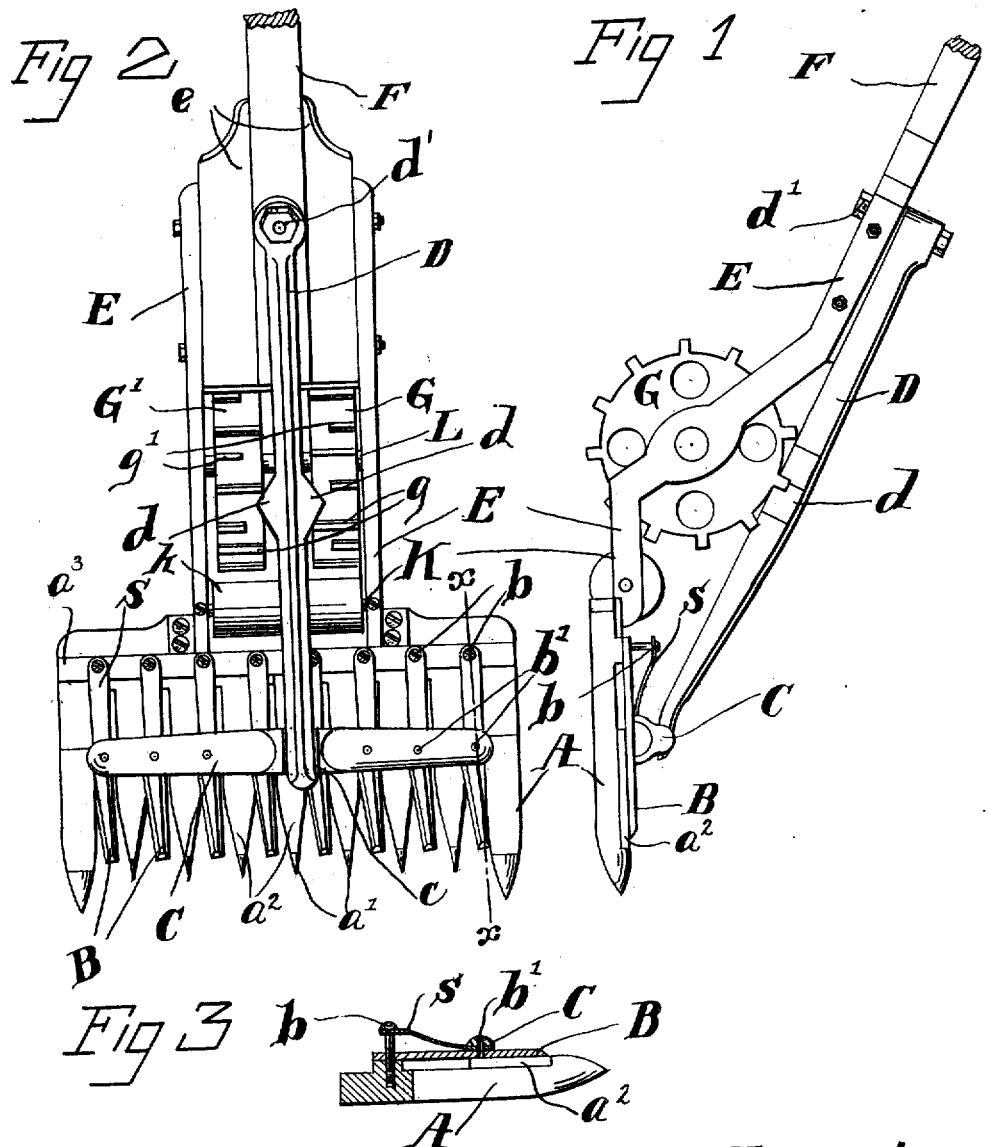

WILLIAM T. BENHAM, OF INDIANAPOLIS, INDIANA.

MOWER.

No. 911,366.  Specification of Letters Patent.  Patented Feb. 2, 1909.

Application filed July 11, 1908. Serial No. 443,160.

*To all whom it may concern:*

Be it known that I, WILLIAM T. BENHAM, a citizen of the United States, residing at Indianapolis, in the county of Marion and State of Indiana, have invented new and useful Improvements in Mowers, of which the following is a specification.

My invention relates to new and useful improvements in mowers, and particularly that type of mower in which the cutting edges reciprocate over the cutter bar.

The object of my invention is to provide a mower which will have a more direct connection between the knives and the drive than those in present use and by this arrangement reduce the power necessary for operation. Furthermore to reduce the cost of construction by causing mechanism which heretofore performed one function of the operation to be adapted to perform two; also to provide a novel spring clip which will prevent the breaking of the knives and reduce the wear and tear on the machine.

To this end my invention consists in a cutter bar comprising a series of guards over which a series of knives oscillate about pivot screws fastened in the rear side of the cutter bar. Spring clips hold the knives against the cutter bar, but are only of such strength as to allow the knives to raise when any foreign matter that cannot be cut gets under the knife and is apt to damage the same. All the knives are connected near their middle by a bar superimposed upon and connected to them by pins fastened to the knives and loosely piercing the bar. The bar is fastened to one end of a lever, the opposite end of which is pivoted at some convenient point on the handle. The lever is oscillated by lugs on the driving wheels and transmits power to the knives, through the superimposed bar.

My invention is illustrated in the following drawings, in which:—Figure 1 is a side elevation of the assembled machine. Fig. 2 is a top plan view of the assembled machine, and Fig. 3 is a section taken along the line $x, x$ in Fig. 2.

Referring to the drawings, A is the cutter bar provided with guards $a^1$ inlaid with pieces $a^2$ of harder material than the guards, and forming bearing surfaces for the cutting portion of the knives B. The cutter bar A is fastened securely to the frame E.

Knives B are pivoted at their rear end to the cutter bar A by means of pivot screws $b$ which loosely pierce the knives and are threaded in a ridge $a^3$ of the cutter bar. Spring clips $s$ hold the knives against the bearing surfaces of the cutter bar and are contiguous at their forward ends with the knives. The rear end of the clips are loosely held by the pivot screws $b$ and are free to oscillate about the same with the knives.

A bar C is superimposed upon the knives and springs; near the end of the springs and about midway of the knives' lengths. Pins $b^1$ are rigidly fastened to the knives B and pivot said knives to the spring clips $s$ and the bar C.

The bar C is provided with a suitable notch $c$ near the middle of its length which receives one end of the lever D, the opposite end of which is pivoted at a convenient point on the handle F by means of a bolt $d^1$ piercing the handle and lever. The lever D carries on each side near the middle of its length cam blocks $d$ integral with the same and adapted to contact with the lugs on the inner edge of the peripheries of the driving wheels.

The frame E is fastened to the cutter bar A and members $e$, which are in turn fastened to the handle F. The driving wheels G and $G^1$ are attached to the shaft L which is journaled in the frame E. Their position relative to each other in respect to rotation is always the same, due to the fact that they are fixed to the same shaft. Lugs $g$ and $g^1$ on the peripheries of the driving wheels give the same a firm rolling contact, thus preventing slipping; and also contact with the cam blocks $d, d$ of the lever D and oscillate the lever, which in turn causes the knives B to oscillate by transmitting its motion through the bar C to the knives. Also journaled in the frame E is roller shaft K, to which roller $k$ is rotatively attached. Roller $k$ affords another rolling contact with the ground and makes the cutting position of the machine more stable.

The operation is as follows:—As the machine is pushed forward the lugs $g$ and $g^1$, which prevent the slipping of the driving wheels, contact with the cam blocks $d, d$ of the lever D and causes the same to oscillate about the bolt $d^1$. Lugs $g$ on each wheel are longer than lugs $g^1$, a short and a long always being exactly opposite each other, so that lever D will be thrown first to one side and then to the other. When one of the lugs $g$ on the wheel G contacts with its cam block $d$, one of the lugs $g^1$ on the opposite wheel $G^1$ is in alinement with the opposite lug $g$, and since the lug $g^1$ is shorter, the lever can move toward it until the next long lug $g$ of the wheel $G^1$ begins to contact with its cam block $d$, when the lever will start back toward the wheel $G$ and conversely. This oscillating motion is transmitted by lever $D$ to the bar $C$, which is connected to the knives and oscillates the same about their pivoted screws $b$.

What I claim as new and desire to secure by Letters Patent of the United States, is:—

1. A mower having in combination a cutter bar, knives adapted to shear against said cutter bar, a common connection for said knives, bearing wheels having alternate long and short lugs with the short lugs of one wheel extending opposite the long lugs of the companion wheel, and means adapted to be actuated by said lugs to actuate said common connection.

2. A mower comprising a cutter bar, knives pivoted to said bar, a common connection for the knives, a pivoted lever connected to said common connection, driving wheels arranged contiguous to each other having their peripheries provided with alternate long and short lugs to prevent their slipping and to contact with the lever and operate the same, said lever having similar cam blocks on opposite edges for engaging said lugs.

3. A mower comprising a cutter bar, knives pivoted to said bar, spring clips to depress the knives against the cutter bar, a common connection for the knives, said connection comprising a bar which extends transversely across the knives and spring clips, and pins fixed to the knives and projecting loosely through the clips and entering said bar, a pivoted lever connected to said common connection, driving wheels carrying parallel alternate long and short lugs to prevent their slipping and to contact with the lever and operate the same.

4. A mower comprising a cutter bar, having guards, knives pivoted to said bar, spring clips to depress the knives against the bar, a common connection for the knives, said connection comprising a bar extending transversely across the knives and spring clips, and pins secured to the knives and projecting loosely through said clips and into said bar, a pivoted lever connected to the common connection of the knives, driving wheels carrying alternate long and short lugs to prevent their slipping and to contact with the lever and oscillate the same, and a roller to aid in holding the machine in a cutting position.

5. In a mower, the combination with a reciprocating bar having cutting knives, and a finger bar over which said knives operate, of a pair of wheels having parallel alternate long and short lugs on their peripheries and adapted to increase the traction of the wheels, and a lever pivoted at one end and having its opposite end connected to operate the knives, said lever having its intermediate portion provided with similar lugs on opposite edges adapted to be engaged by the lugs on said wheels.

In testimony whereof I have hereunto set my hand in presence of two subscribing witnesses.

WILLIAM T. BENHAM.

Witnesses:
W. S. LEMON,
M. F. LAAKER.